United States Patent [19]
Sansone et al.

[11] Patent Number: 6,142,380
[45] Date of Patent: Nov. 7, 2000

[54] USAGE OF DUAL LUMINESCENT INKS TO PRODUCE A POSTAL ORIENTING AND SORTING IDENTIFICATION MARK FOR AN INFORMATION-BASED INDICIA

[75] Inventors: Ronald P. Sansone, Weston; Richard A. Bernard, Norwalk; Judith D. Auslander, Westport, all of Conn.

[73] Assignee: Pitney Bowes Inc., Stamford, Conn.

[21] Appl. No.: 09/164,511

[22] Filed: Sep. 30, 1998

[51] Int. Cl.[7] .................................................. G06K 19/00
[52] U.S. Cl. ........................ 235/487; 235/468; 235/470; 235/375
[58] Field of Search .................................... 235/468, 375, 235/462.01, 462.07, 470, 451, 487

[56] References Cited

U.S. PATENT DOCUMENTS

| | | | |
|---|---|---|---|
| 4,983,817 | 1/1991 | Dolash et al. ............... | 235/462.01 |
| 5,542,971 | 8/1996 | Auslander et al. ........... | 106/21 |
| 5,554,842 | 9/1996 | Connell et al. .............. | 235/491 |
| 5,569,317 | 10/1996 | Sarada et al. ............... | 106/21 A |
| 5,586,036 | 12/1996 | Pintsov ....................... | 380/51 |
| 5,773,808 | 6/1998 | Laser .......................... | 235/462.01 |
| 5,917,925 | 6/1999 | Moore .......................... | 382/101 |
| 5,988,057 | 11/1999 | Saloman et al. .............. | 101/91 |
| 6,039,257 | 3/2000 | Berson et al. ................ | 235/468 |

*Primary Examiner*—Thien M. Le
*Assistant Examiner*—Daniel St. Cyr
*Attorney, Agent, or Firm*—Ronald Reichman; Michael E. Melton

[57] ABSTRACT

An information based indicia (IBI) that does not require a FIM and is able to be read by Advanced Facer Canceller Systems. The foregoing is accomplished by printing on the mail piece an upper layer IBI indicia over a lower layer invisible ink. The lower layer ink is a dual luminescent ink that is invisible to the naked eye and the upper layer IBI indicia is printed with an ink that is visible to the naked eye. The lower layer may also be produced by two inks, one of which is fluorescent and the other of which is phosphorescent. The fluorescent ink will be printed in one area of the lower layer and the phosphorescent inks will be printed in another area of the lower layer.

9 Claims, 4 Drawing Sheets

USAGE OF DUAL LUMINESCENT INKS TO PRODUCE A POSTAL ORIENTING AND SORTING IDENTIFICATION MARK FOR AN INFORMATION-BASED INDICIA

CROSS REFERENCE TO RELATED APPLICATIONS

Reference is made to commonly assigned co-pending patent application: Docket No. E-716 filed herewith entitled "Fluorescent And Phosphorescent Ink For Use With An Information-Based Indicia" in the names of Richard A. Bernard, Judith A. Auslander, and Ronald P. Sansone.

FIELD OF THE INVENTION

The invention relates generally to the field of franking machines and more particularly to the printing of postal indicia.

BACKGROUND OF THE INVENTION

Historically, postage meters have been mechanical and electromechanical devices that: maintain through mechanical or "electronic registers" (postal security devices) an account of all postage printed and the remaining balance of prepaid postage; and print postage postmarks (indicia) that are accepted by the postal service as evidence of the prepayment of postage.

Soon, small business mailers may be able to use their desktop computer (personal computer) and printer to apply postage directly onto envelopes or labels while applying an address. The United States Postal Service Engineering Center recently published a notice of proposed specification that may accomplish the foregoing. The title of the specification is Information-Based Indicia Program Postal Security Device Specification, dated Jun. 13, 1996. The Information-Based Indicia Program specification includes both proposed specifications for the new indicium and proposed specifications for a postal security device (PSD). The proposed Information-Based Indicia (IBI) consists of a two-dimensional bar code containing hundreds of bytes of information about the mail piece and certain human and machine readable information. The indicium includes a digital signature to preclude the forgery of indicia by unauthorized parties. The postal security device is a unique security device that provides a cryptographic digital signature to the indicium and performs the function of postage meter registers.

Current United States Postal Service IBI specifications require a Facing Identification Mark (FIM) to be part of the IBI indicia so that the USPS Advanced Facer Canceller may detect the presence of an IBI mail piece so as to sort the mail piece properly. In the United States, the FIM is a pattern of vertical bars printed in the upper right portion of the mail piece, to the left of the indicia. A FIM pattern is essentially a nine bit code consisting of bars and no bar place holders. The presence of a bar can be considered a binary one "1" and the absence of a bar a binary "0". Thus, as currently specified, the United States Postal Service FIM is large, taking up approximately 20% of the proposed IBI indicia.

Personal computer printers have difficulty in reliably printing the FIM portion of the IBI indicia. The reason for the foregoing is that the FIM is located near the top edge of the envelope and it is difficult for personal computer printers to print near the top edge of the envelopes. Furthermore, the FIM carries low information density when compared to other data elements of an IBI indicia. A disadvantage of the prior art is that a FIM wastes a large amount of envelope space.

Another disadvantage of the prior art is that it is difficult for personal computer printers to print an IBI indicia in proper registration to a preprinted FIM.

For many years, the United States Postal Service and other Postal Services have been selling stamps that are printed with phosphorescent inks. The Postal Services also require and accept postal indicia that have been printed by a postage meter that uses fluorescent inks. Current fluorescent inks that are used in postage meters, approved by the United States Postal Service, contain a fluorescent ink that is excited by a 254 nm ultraviolet light source that emits a fluorescent light in the orange to red region of the visible spectrum between 580 to 650 nm.

Typically, luminescence will become visible to the naked eye when stimulated or excited by suitable radiation. Fluorescent inks and phosphorescent inks are types of luminescent inks. The emission of light from a fluorescent ink is caused by the absorption of energy (light or electromagnetic radiation) into the inks molecules, causing the ink molecules to be in an excited state and to emit or be fluorescent. The fluorescence ceases abruptly when the energy source is removed. The emission of light from a phosphorescent ink will persist for a time interval after the energy source has been removed.

Mail sorting equipment, like the Advanced Facer Cancelling System manufactured by Simmons Electrocom, is being used at postal incoming mail processing stations to detect, cancel and then sort, using the phosphorescent stamps that have been affixed to mail pieces. These systems also check whether or not the postal indicia affixed to mail pieces were affixed by an authorized postal meter, i.e., whether or not the indicia is fluorescent. The United States Postal Service Advanced Facer Canceller System faces (arranges mail so all addresses and indicia are facing the same way), cancels the stamps affixed to mail pieces and then sorts letter mail into three mail streams: pre-bar coded letters; OCR readable (typed/machine imprinted) letters, and hand written or script letters. The IBI FIM may be detected and segregated into a fourth stream of mail.

SUMMARY OF THE INVENTION

This invention overcomes the disadvantages of the prior art by providing an IBI indicia mail piece that does not require a printed FIM and which will be able to be read and sorted by Advanced Facer Canceller Systems. The foregoing is accomplished by printing on the mail piece an upper layer IBI indicia over a lower layer invisible ink. The lower layer ink is a dual luminescent ink that is invisible to the naked eye and the upper layer IBI indicia is printed with an ink that is visible to the naked eye. The lower layer may also be produced by two inks, one of which is fluorescent and the other of which is phosphorescent. The fluorescent ink will be printed in one area of the lower layer and the phosphorescent inks will be printed in another area of the lower layer.

DETAILED DESCRIPTION OF THE PREFERRED EMBODIMENT

Figure 1:
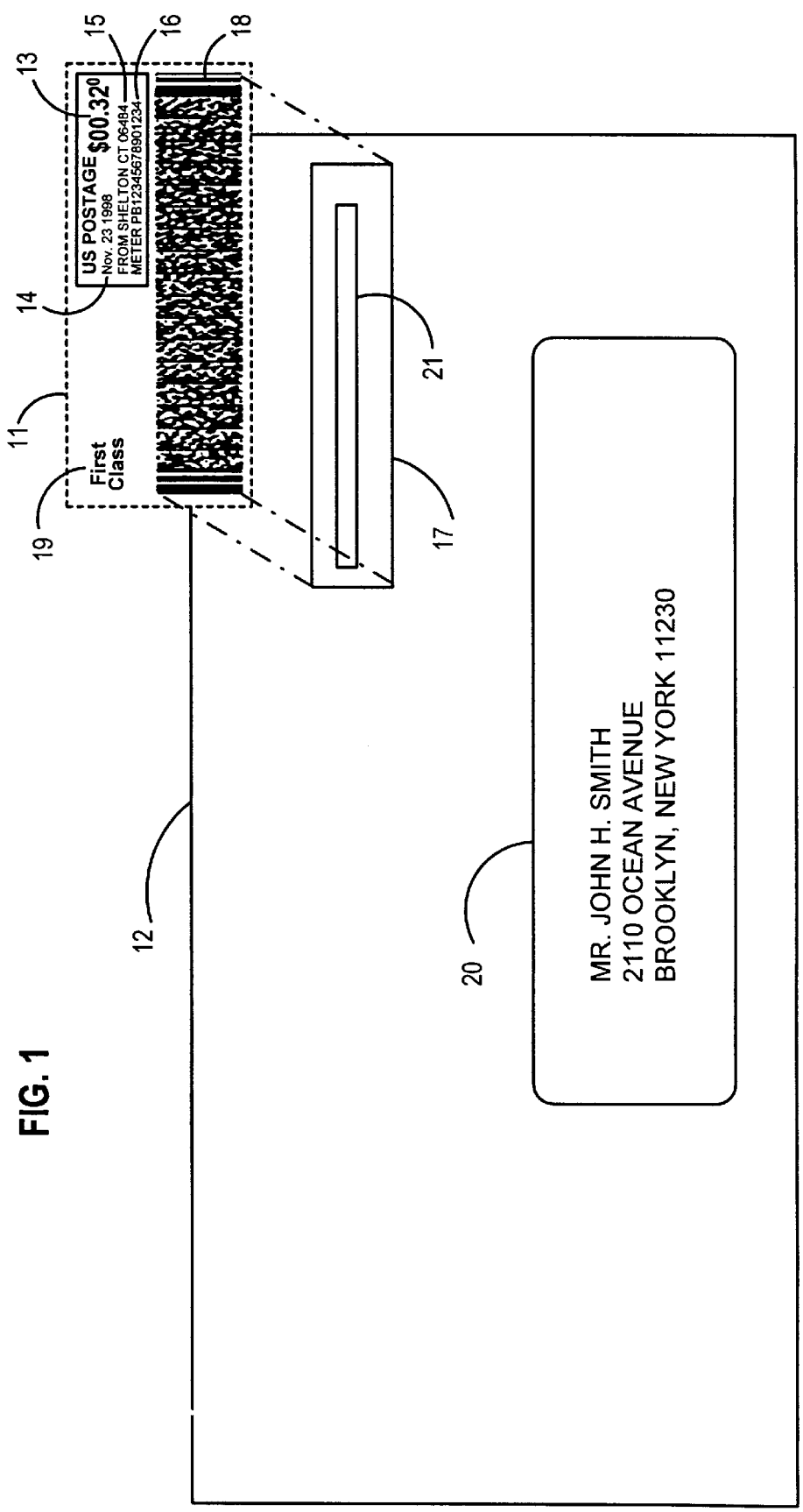
FIG. 1 is a drawing of a upper layer IBI indicia printed over a preprinted lower layer dual luminescent ink.

Referring now to the drawings in detail, and more particularly to FIG. 1, the reference character 11 represents a USPS Information-Based Indicia (IBI) that was printed on mail piece 12 by a printer. The postal indicia 11 contains a dollar amount 13, the date 14 that the postal indicia was affixed to the mail piece, the place the mail piece was mailed from 15, the postal meter serial number 16, a 2-D encrypted bar code 18. Mail piece 12 also contains an indication 19 of the class of mail piece 12. Indicia 11 is printed over area 17 in a manner that 2-D encrypted bar code 18 will be an upper layer that will be directly printed over lower layer area 17. Area 17 contains a portion 21. Portion 21 is printed with a dual luminescent ink. A dual luminescent ink is disclosed in co-pending U.S. patent application, Ser. No. 09/164,510 entitled "Fluorescent And Phosphorescent Ink For Use With An Information-Based Indicia" in the names of Richard A. Bernard, Judith A. Auslander, and Ronald P. Sansone. Mail piece 12 is going to be sent to the person and place indicated in address field 20

A dual luminescent ink is used so that the Advanced Facer Canceller System will receive enough signal to trigger its IBI sortation capabilities. The facer canceller may be set to recognize, as a new form of mail, and sort a mail piece having a dual luminescent ink that exhibits the green or red phosphorescence of a stamp and the fluorescence of a postal indicia. The facer canceller may let the mail piece enter the mail system if the facer canceller sensors detect the dual luminescent ink. A facer canceller will: cancel a phosphorescent stamp; will sort FIM—or dual luminescent-bearing mail; will not cancel a fluorescent postal indicia; and will remove other mail pieces that do not have FIMs or dual luminescent inks.

The ink that is used to print 2-D encrypted bar code 18 must be dark enough (low reflectivity) so that when it is printed on top of portion 21, it may be read.

Figure 2:
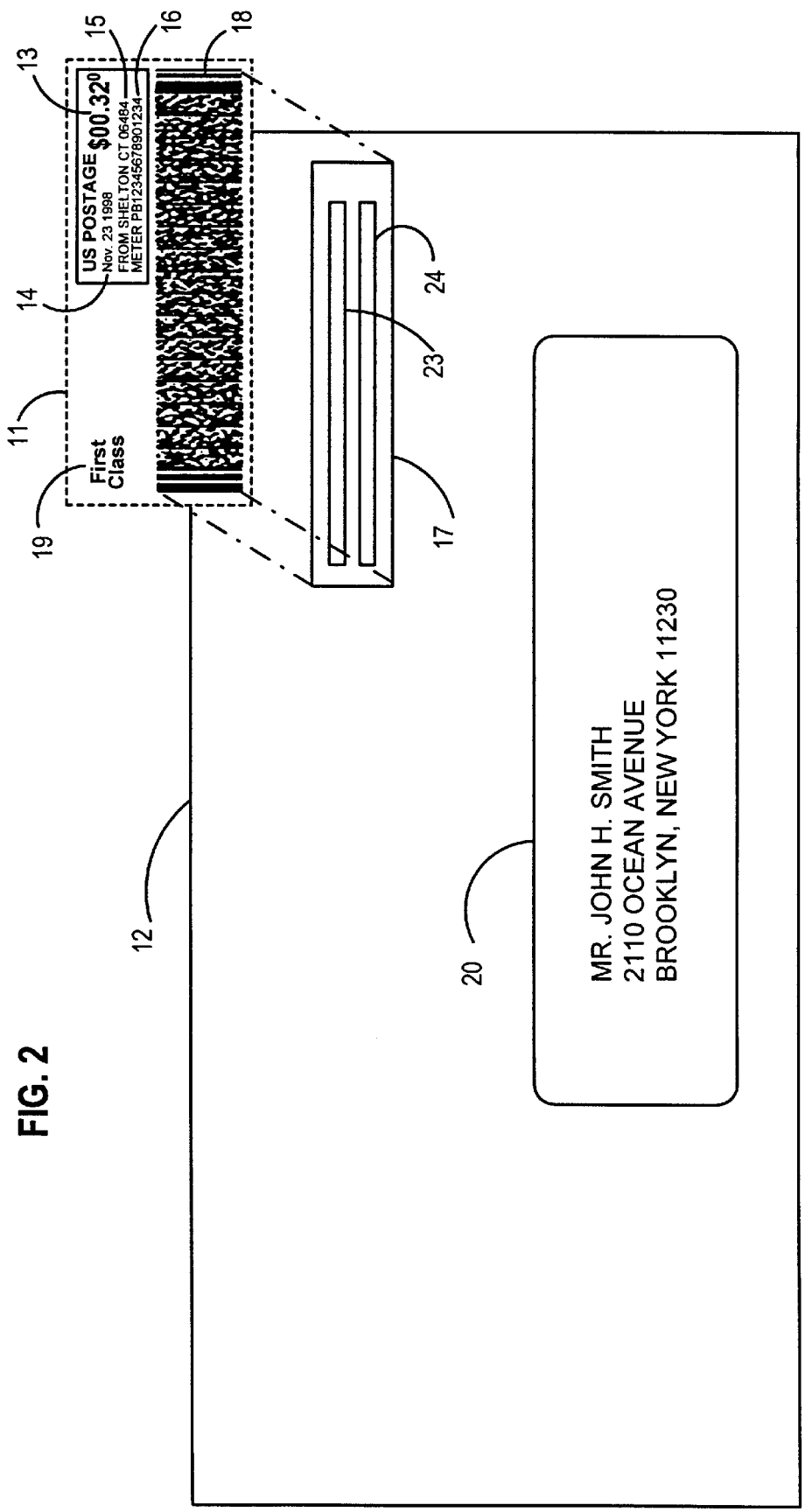
FIG. 2 is a drawing of an alternate embodiment of this invention showing an upper layer IBI indicia printed over a preprinted lower layer having a fluorescent portion and a phosphorescent portion.

FIG. 2 is a drawing of an alternate embodiment of this invention showing an upper layer IBI indicia printed over a pre-printed lower layer having a fluorescent portion and a phosphorescent portion. The postal indicia 11 contains a dollar amount 13, the date 14 that the postal indicia was affixed to the mail piece, the place the mail piece was mailed from 15, the postal meter serial number 16, and a 2-D encrypted bar code 18. Mail piece 12 also contains an indication 19 of the class of mail piece 12. Indicia 11 is printed over area 17 in such a manner that 2-D encrypted bar code 18 will be an upper layer that will be directly printed over lower layer area 17. Area 17 contains portions 23 and 24. Portion 23 is printed with a fluorescent ink and portion 24 is printed with a phosphorescent ink. Mail piece 12 is going to be sent to the person and place indicated in address field 20.

It would be obvious to one skilled in the art that portions 23 and 24 may be printed under other areas of indicia 11, or portion 23 may be printed under 2-D bar code 18 and portion 24 may be printed under other areas of indicia 11. It would also be obvious to one skilled in the art that portion 24 may be printed under bar code 18 and portion 23 may be printed under other areas of indicia 11. For some of the conditions described above, variations in the signal level from portions 23 and 24 are indicative of an overprinted IBI. Overprinting the IBI is done to produce a measurable change in the luminosity in portions 23 and 24. This difference in luminosity is indicative of overprinting.

A fluorescent ink portion 23 and a phosphorescent ink portion 24 is used so that the Advanced Facer Canceller System will receive enough signal to trigger its sortation capabilities. The facer canceller may be set to recognize, as a new form of mail, a mail piece having a fluorescent and phosphorescent ink that exhibits the green or red phosphorescence of a stamp and the fluorescence of a postal indicia. The facer canceller may let the mail piece enter the mail system if the facer canceller detects the dual luminescent ink. A facer canceller will: cancel a green or red phosphorescent stamp; will not cancel a fluorescent postal indicia; and will remove other mail pieces that do not have FIMs or fluorescent and phosphorescent portions.

The ink that is used to print 2-D encrypted bar code 18 must be dark enough (low reflectivity) so that when it is printed on top of portions 23 and 25, the reflectance ratio shall be greater than 0.5.

Figure 3:
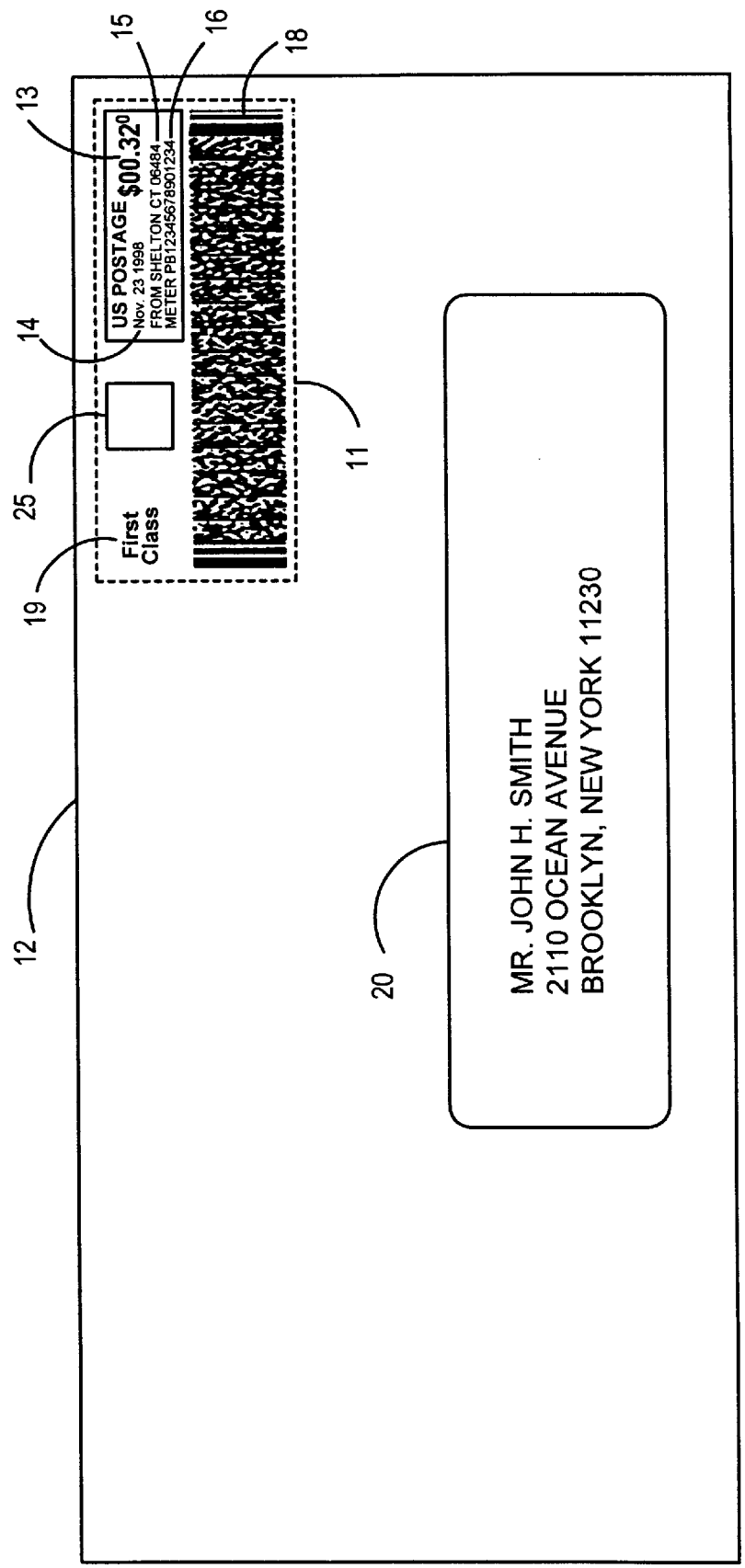
FIG. 3 is a drawing of an alternate embodiment of this invention showing an area printed by a dual luminescent ink in the vicinity of an IBI indicia.

FIG. 3 is a drawing of an alternate embodiment of this invention showing an area which is printed by a dual luminescent ink in the vicinity of an IBI indicia. The postal indicia 11 contains a dollar amount 13, the date 14 that the postal indicia was affixed to the mail piece, the place the mail piece was mailed from 15, the postal meter serial number 16, a 2-D encrypted bar code 18, and an area 25 that is printed with a dual luminescent ink. It will be obvious to one skilled in the art that area 25 may be printed in any location near the vicinity of indicia 11. Mail piece 12 also contains an indication 19 of the class of mail piece 12. Mail piece 12 is going to be sent to the person and place indicated in address field 20.

Figure 4:
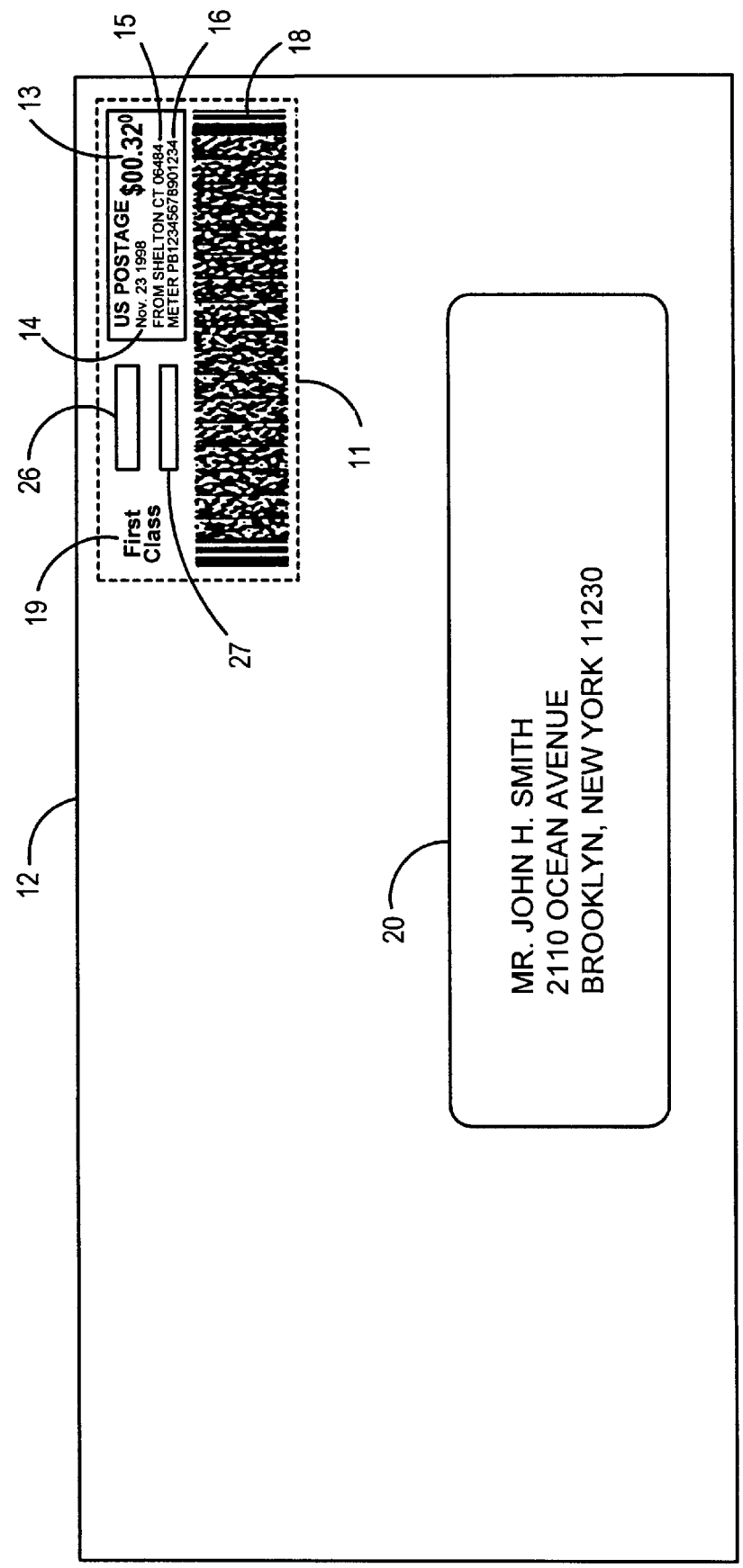
FIG. 4 is a drawing of an alternate embodiment of this invention showing an area printed by a fluorescent ink and an area printed by a phosphorescent ink in the vicinity of an IBI indicia.

FIG. 4 is a drawing of an alternate embodiment of this invention showing an area that is printed by a fluorescent ink and an area printed by a phosphorescent ink in the vicinity of an IBI indicia. The postal indicia 11 contains a dollar amount 13, the date 14 that the postal indicia was affixed to the mail piece, the place the mail piece was mailed from 15, the postal meter serial number 16, a 2-D encrypted bar code 18, an area 26 that is printed with a fluorescent ink and an area 27 that is printed with a phosphorescent ink. It will be obvious to one skilled in the art that areas 26 and 27 may be printed in any location near the vicinity of indicia 11. Mail piece 12 also contains an indication 19 of the class of mail piece 12. Mail piece 12 is going to be sent to the person and place indicated in address field 20.

The above specification describes a new and improved IBI indicia that does not require a FIM and will be able to be read by Advanced Facer Canceller Systems. It is realized that the above description may indicate to those skilled in the art additional ways in which the principles of this invention may be used without departing from the spirit. It is, therefore, intended that this invention be limited only by the scope of the appended claims.

What is claimed is:

1. An improved information based indicia that is affixed to a mail piece comprising: printing one or more areas of the information-based indicia that will be recognized by at least one fluorescent detector and at least one phosphorescent detector of a facer canceller so that the facer canceller will recognize the indicia as the information based indicia even though a facing identification mark is not present.

2. The indicia claimed in claim 1, wherein a fluorescent area is printed in the indicia and a phosphorescent area is printed in the indicia.

3. The indicia claimed in claim 2, wherein the fluorescent area and the phosphorescent area are printed under different areas of the indicia.

4. The indicia claimed in claim 3, wherein variations of the signal level of the fluorescent and phosphorescent areas are indicative of the overprinted Information Based Indicia.

5. The indicia claimed in claim 1, wherein a fluorescent area is printed in the vicinity of the indicia and a phosphorescent area is printed in the vicinity of the indicia.

6. The indicia claimed in claim 1, wherein a dual luminescent area is printed in the indicia.

7. The indicia claimed in claim 1, wherein a dual luminescent area is printed in the vicinity of the indicia.

8. The indicia claimed in claim 1, wherein the one or more areas is a lower layer printed with a dual luminescent ink and the remainder of the indicia is printed over the entire lower layer.

9. The indicia claimed in claim 1, wherein the one or more areas is a lower layer printed with a dual luminescent ink and the remainder of the indicia is printed over a portion of the lower layer.

* * * * *